United States Patent [19]
Hobbs

[11] 3,745,913
[45] July 17, 1973

[54] SHUCKER
[76] Inventor: Oliver K. Hobbs, 120 Elm St., Suffolk, Va.
[22] Filed: Apr. 16, 1971
[21] Appl. No.: 134,747

[52] U.S. Cl..................................... 99/625, 99/616
[51] Int. Cl.............................................. A23n 5/08
[58] Field of Search ................ 146/32, 8, 8 H, 291; 99/616, 625

[56] References Cited
UNITED STATES PATENTS
2,433,730  12/1947  Bridge.................................. 146/32
1,623,739  4/1927  MacFarlane..................... 146/291 X Primary Examiner—Gil Weidenfeld
Attorney—Clelle W. Upchurch

[57] ABSTRACT

An apparatus is provided for shucking pecan bollies and similar nuts which has a pair of continuous belts disposed one over the other in face to face relationship and rotated in opposite directions between spaced pairs of idler rollers. One roller of each pair is adapted to move vertically and respond to pressure of nuts passing between the pair to provide for sufficient compression to break the shucks but to avoid cracking of the nut shell.

8 Claims, 5 Drawing Figures

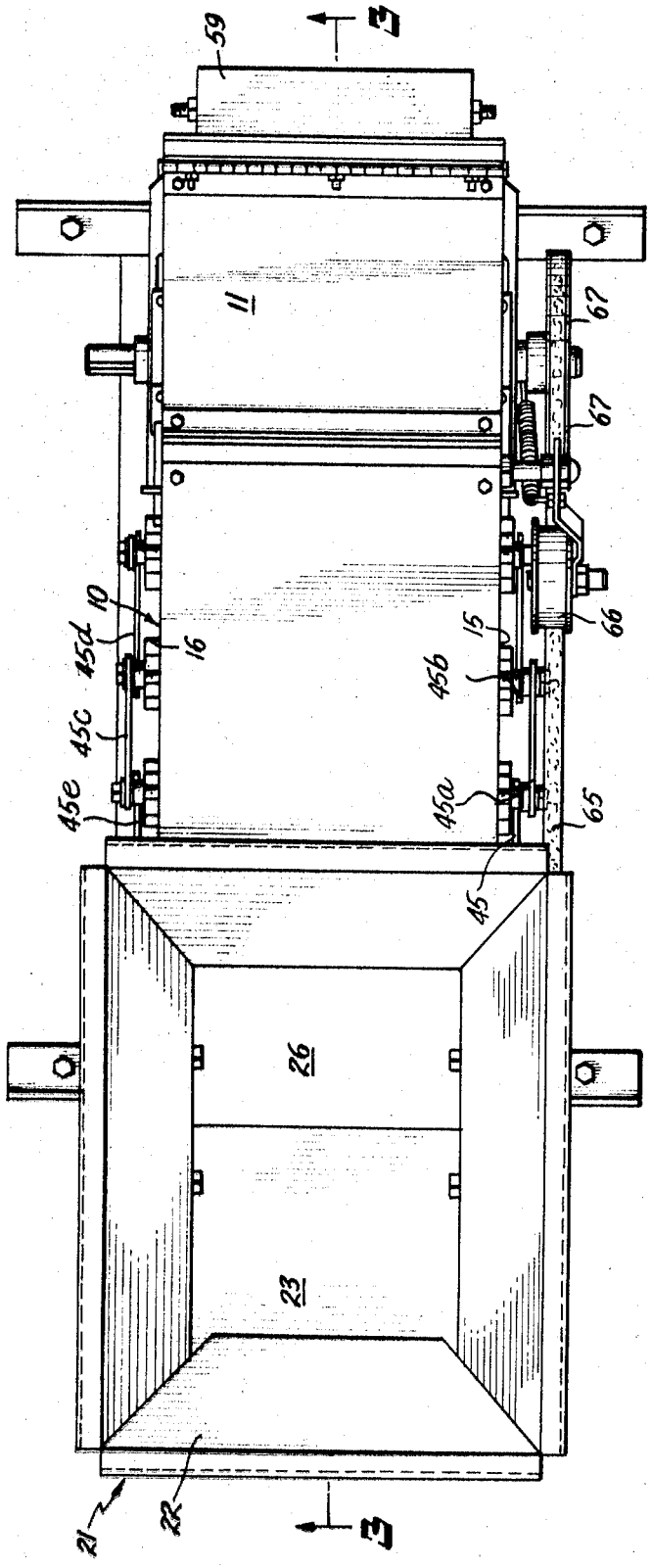

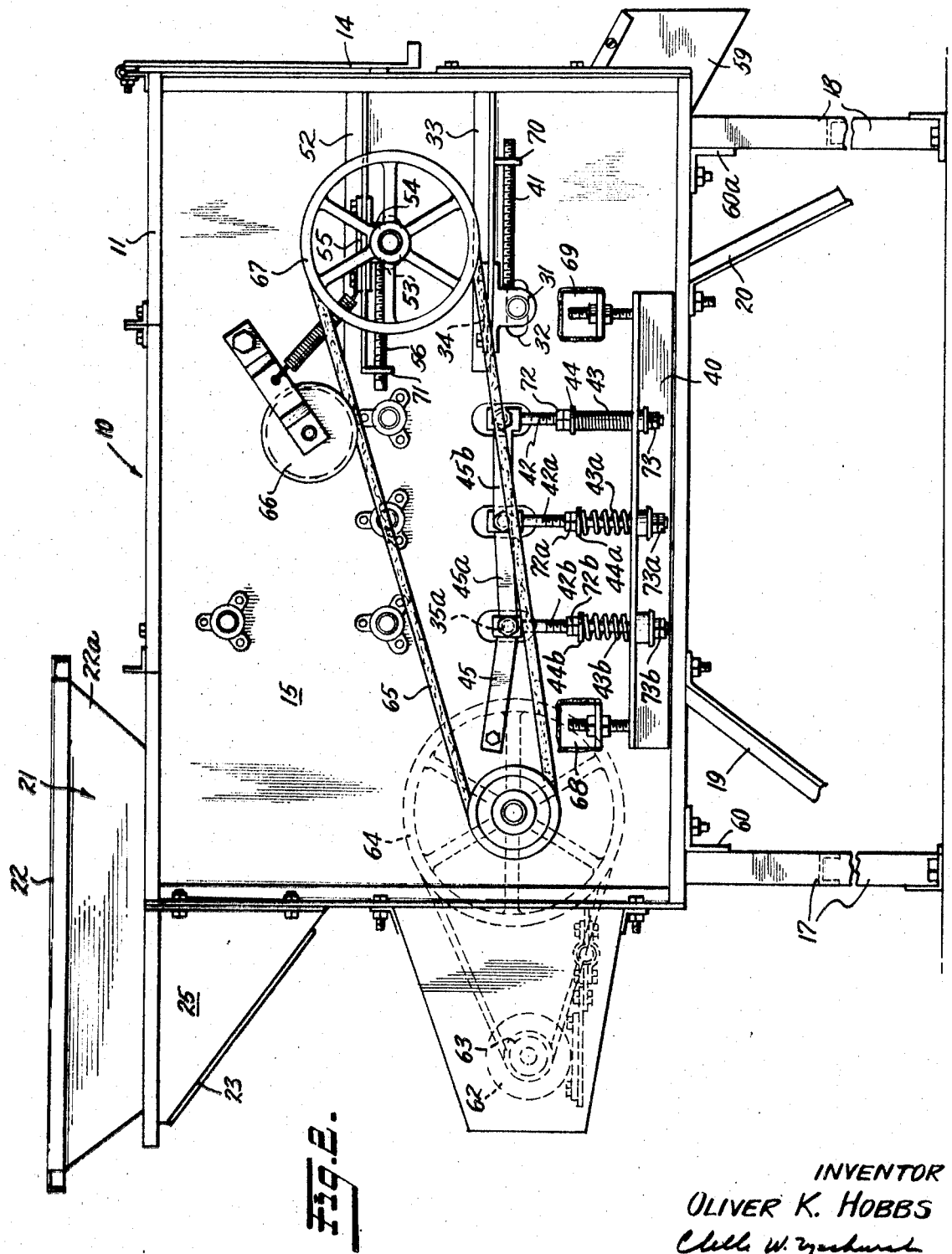

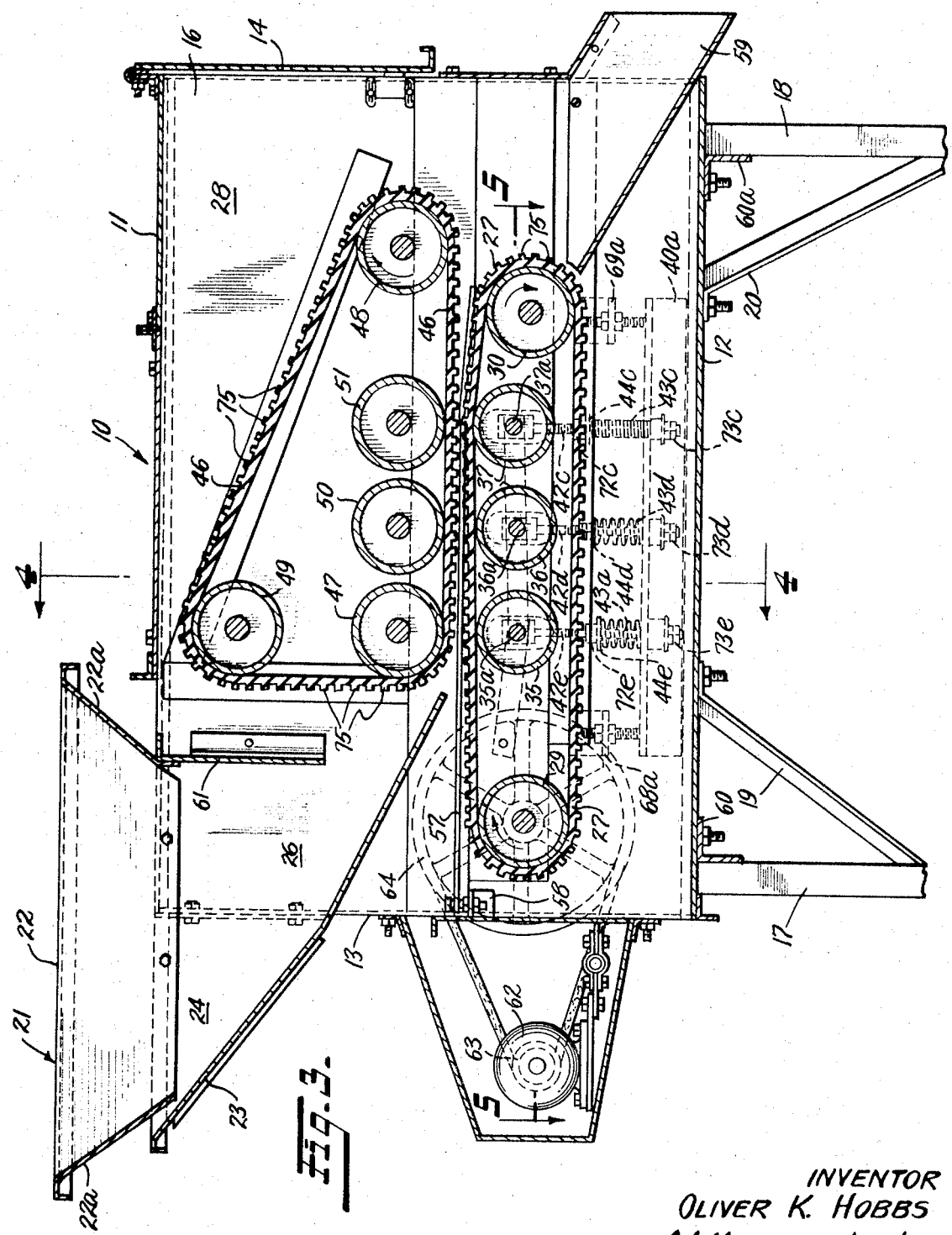

INVENTOR
OLIVER K. HOBBS

SHUCKER

This invention relates generally to an apparatus for shucking nuts and more particularly to an improved apparatus adapted to remove the shucks from pecans, walnuts and the like.

Most pecans shed their shucks if permitted to remain on the tree until they fall naturally. Pecans from which the outer covering or shuck did not open or shed naturally are known as pecan "bollies." The percentage of bollies in a pecan crop is much greater in one which has been shaken from the trees than one which has fallen naturally from the trees. However, it is usually impractical to wait for a natural fall so most pecan growers shake the trees to remove the nuts. Many of the nuts shaken from the trees have green shucks which must be removed before artificial drying or storing to avoid loss from deterioration.

It has been proposed to shuck pecan bollies on an apparatus designed for shucking walnuts. The device abrades the shucks from the nuts with wire fingers. The ground shucks are washed away with water. Such an apparatus, however, has the disadvantage of requiring removal of the water from the nuts.

It is therefore an object of this invention to provide an apparatus for removing the shucks from pecans and other nuts which is simple in construction, easily operated, durable, inexpensive to construct and to operate and capable of shucking nuts in commercially practical quantities per unit of time. Another object of the invention is to provide an apparatus which will break and remove the shucks from nuts without cracking or breaking the shells. Still another object of the invention is to provide an apparatus for shucking nuts which can be easily adjusted to accommodate various sizes and varieties of pecan bollies and other nuts having shucks thereon. A further object of the invention is to provide an apparatus which is especially effective for shucking pecan bollies of various sizes but can also be adjusted to be used for shucking walnuts and similar nuts.

Other objects will become apparent from the following description of the invention with reference to the accompanying drawing in which FIG. 1 is a plan view of one embodiment of the invention;

FIG. 2 is a side elevation of the embodiment of FIG. 1;

FIG. 3 is a longitudinal sectional view taken along the line 3—3 of FIG. 1;

Figure 5:
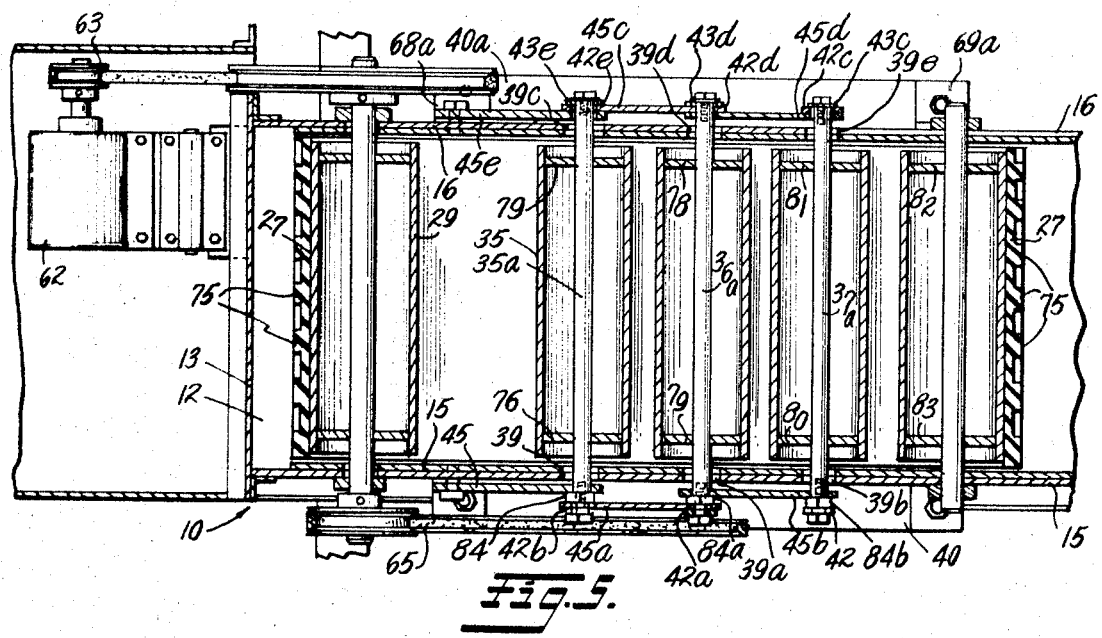
FIG. 5 is a fragmentary horizontal sectional view, taken substantially on the line 5—5 of FIG. 3, illustrating the support for the resilient idler rollers of an embodiment of the invention.

The foregoing objects and others are accomplished in accordance with this invention, generally speaking, by providing an apparatus having a pair of continuous belts which are disposed one over the other in face to face relationship and are rotated in opposite directions between spaced pairs of rollers disposed one over the other with the speed of one belt being greater than that of the other. One roller of each pair is resiliently supported and responds to nut size and shape to adjust the belt spacing between the pair of rollers to compress nuts as they pass therebetween along the belts but to avoid pressures which crack or break the nut shells or prevent passage of the nuts therebetween. The belts are disposed in a shucking chamber enclosed by a suitable housing and are of substantially the same width as the chamber. The lower belt is looped about longitudinally spaced transverse end rollers with one roller being an idler roller near one end of the chamber and the other being a drive roller near the other end of the chamber. One or more transverse idler rollers are disposed between the end rollers and against the underside of the top portion of the loop of the lower belt. The upper belt is also looped about longitudinally spaced transverse end rollers and is disposed in face to face relationship immediately above the lower belt. One end roller is an idler roller and the other is a drive roller. One or more transverse idler rollers are also disposed between the end rollers of the upper belt and against the lower portion of the loop of the belt. The number of intermediate idler rollers supporting the lower belt is one more than the number supporting the upper belt. The end idler roller and the intermediate rollers adjacent the upper belt are each directly above one of the intermediate rollers adjacent the lower belt. The intermediate rollers adjacent the upper belt and one of the end rollers are journaled in bearings which are rigidly secured on the housing of the apparatus. One of the end rollers adjacent the upper belt and one of the end rollers adjacent the lower belt are journaled in bearings which are rigidly secured on the housing but can be moved longitudinally with an adjusting bolt to adjust the tension on the belts. The other end roller of the lower belt is also journaled in bearings which are rigidly secured on the housing. The intermediate idler rollers adjacent the lower belt are journaled in bearings which are resiliently mounted and can be moved vertically independently of each other to adjust the spacing between the lower roller and the opposite idler roller adjacent the upper belt.

Pecan bollies, walnuts or the like are poured into a hopper and fall by gravity to the surface of the lower belt. As the nuts are carried longitudinally by the belts they must pass between the nip of each pair of rollers. Pressure exerted on the nuts by the rollers breaks or causes the shucks to snap loose from the nut. The surfaces of the belts are preferably roughened so they assist in removing the segments of the shuck or broken pieces from the nuts. Usually the lower belt is rotated in a direction away from the hopper and the upper belt is rotated towards the hopper. The lower belt is rotated at a greater speed than the upper belt so the nuts and shucks or hulls are carried to the opposite end of the chamber and discharged therefrom. If desired, the direction of travel of each belt can be reversed and the speed of the belts can be adjusted so the upper one travels faster than the lower one. In this way the shucked nuts will be discharged at one end and the trash and shucks at the other end of the belts. Very close adjustments are required, however, and the efficiency of the apparatus is adversely effected so it is preferred to operate the apparatus with the lower belt rotating away from the hopper and faster than the upper belt. If the belts are to be rotated to discharge pieces of shucks at one end and shucked nuts at the other end, a discharge hopper is required at each end of the lower belt.

Referring now to FIGS. 1, 2 and 3 of the drawing, a preferred embodiment of the invention has a housing 10 with top 11, bottom 12, end walls 13 and 14 and sidewalls 15 and 16 enclosing a shucking chamber 28. Housing 10 is supported by cross-bar and leg assemblies 17 and 18 at opposite ends thereof. Angle iron brackets 60 and 60a of assemblies 17 and 18 are bolted to housing 10. Braces 19 and 20 rigidly secured at one end to housing 10 and at the other end to assemblies 17 and 18 strengthen the support of the apparatus.

A hopper 21 has an inverted frusto-pyramidal shaped open top portion 22 defined by downwardly and inwardly sloping walls 22a. Walls of top portion 22 of hopper 21 are fixedly secured to housing 10 and to vertical sidewalls 24 and 25 which combine with sloping wall 23 to enclose the chute 26 of hopper 21. Panel 61 is rigidly secured to sidewalls 15 and 16 and extends downwardly from top 11 to form a wall or baffle which prevents nuts from reaching the front end of top belt 46.

A substantially elliptically shaped lower belt 27 extends longitudinally through shucking chamber 28. That end of belt 27 which is below hopper 21 is trained about transverse drive roller 29 while the opposite end of the loop of belt 27 is trained about transverse idler roller 30. Roller 29 is journaled in bearings rigidly secured on sidewalls 15 and 16. Roller 30 is journaled in pillow block bearings 31 which are rigidly secured while belt 27 rotates but may be moved in slots 32 in sidewall 15 and 16 to adjust the tension on belt 27 when it is not rotating. Angle iron brackets 33 are fixedly secured on sidewalls 15 and 16 just above the slot 32. The base of bracket 33 is slotted. The bar of the housing of each bearing 31 lies against the underside of the base of a bracket 33 and bar member 34 lies against the upper side. The ends of the bar member of bearing 31, of bar member 34 and adjustment bolt 41 are bolted securely together when belt 27 is being rotated. However, when belt 27 is stationary bearing 31 can be moved horizontally in slot 32 by turning threaded adjustment bolt 41 in threaded opening of end member 70 of bracket 33 to adjust the tension on belt 27.

The upper portion of the loop of belt 27 between rollers 29 and 30 is supported by resiliently mounted transverse idler rollers 35, 36 and 37. Each roller 35, 36 and 37 is journaled in internal bearings 76, 77, 78, 79, 80, 81, 82 and 83 for rotation of the roller relative to shafts 35a, 36a and 37a. One end of shafts 35a, 36a and 37a extends outwardly through openings or slots 39, 39a and 39b in sidewall 15 and the other end through slots 39c, 39d and 39e in sidewall 16. As best shown in FIGS. 2 and 5, adjustment bars 40 and 40a are bolted to brackets 68 and 69 and 68a and 69a which are rigidly secured to sidewalls 15 and 16 and are disposed below openings 39, 39a and 39b and 39c, 39d and 39e, respectively. Adjustment bolts 42, 42a and 42b have shafts which extend vertically through compression springs 43, 43a and 43b and through openings in adjustment bar 40 while adjustment bolts 42c, 42d and 42e have their shafts extending vertically through compression springs 43c, 43d and 43e and through openings in adjustment bar 40a.

Washers 44, 44a and 44b and nuts 72, 72a and 72b are disposed between springs 43, 43a and 43b and the flat pads secured to the heads of bolts 42, 42a and 42b. Washers 44c, 44d and 44e and nuts 72c, 72d and 72e are similarly disposed between springs 42c, 42d and 42e and the heads of bolts 42c, 42d and 42e.

Rigid flat bar 45 is loosely bolted at one end to sidewall 15. A mounting bolt is threadably secured to the end of shaft 35a and passes through openings in the opposite end of bar 45, one end of bar 45a and the pad of bolt 42b. The end of bar 45 is rigidly secured to the end of shaft 35a between a nut on the shaft of the bolt and the end of the shaft. The end of 45a and of 42b are loosely held between the nut 84 and bolt head. A bolt threadably secured to the opposite end of shaft 35a loosely secures one end of bar 45e, bolt pad 42e and a first end of flat bar 45c to the end of the shaft 35a. The opposite end of flat bar 45e is loosely bolted to sidewall 16. The second end of bar 45a, the pad of bolt 42a and a first end of flat bar 45b are secured by a mounting bolt threadably secured in that end of shaft 36a adjacent sidewall 15. A nut 84a on the shaft of the mounting bolt rigidly secures the end of 45b to shaft 36a while 42a and 45a are loosely held between the nut 84a and the head of the mounting bolt. The second end of bar 45c, the pad on bolt 42d and a first end of flat bar 45d are loosely secured to the end of shaft 36a adjacent sidewall 16 by means of a bolt threadably mounted in the end of shaft 36a. The opposite end of flat bar 45d and the pad of adjustment bolt 42c are loosely secured to the end of shaft 37a by a bolt threadably secured in the end of the shaft. The second end of flat bar 45b and the pad of bolt 42 are secured to the end of shaft 37a adjacent sidewall 15. Bar 45b is spring steel and is rigidly secured to the end of shaft 37a between a nut 84b on the mounting bolt while bolt 42 is loosely secured between the nut 84b and the head of the mounting bolt. The rigid connections of bar 45 to the end of shaft 35a, one end of bar 45b to shaft 36a and the other end to shaft 37a prevent the roller shafts from rotating. As pointed out above, rollers 35, 36 and 37 are journaled in internal bearings 76, 77, 78, 79, 80, 81, 82 and 83 for rotation about shafts 35a, 36a and 37a. All other connectors of 45a, 45c, 45d and 45e are loosely connected at all points to allow each idler roller to pivot but assure that 35 is always close to its most ideal position relative to 47 while 36 and 37 are close to 50 and 51, respectively.

Again referring to FIG. 3, a second continuous belt 46 is looped about longitudinally spaced transverse rollers 47 and 48 and about transverse roller 49 which is substantially directly above roller 47. Roller 48 is a drive roller for rotating belt 46 while rollers 47 and 49 are idler rollers. Two longitudinally spaced transverse idler rollers 50 and 51 support the lower loop of belt 46 between rollers 47 and 48. The ends of the shafts of rollers 47, 49, 50 and 51 are all journaled in bearings which are rigidly secured on sidewalls 15 and 16 as best shown in FIG. 2. The ends of the shaft of roller 48 are journaled in pillow block bearings 54 which can be moved longitudinally in slots in sidewalls 15 and 16 to adjust the tension on belt 46. Taking the end of the shaft of roller 48 secured on sidewall 15 as an example, a bracket 52 similar to bracket 33 is rigidly secured on sidewall 15 just above a slot 53. The base of bracket 52 is slotted. The bar member of pillow bearing 54 lies against the underside of the base of bracket 52 and flat bar 55 lies against the upper side. The ends of the bar of bearing 54, of flat bar 55 and the head of adjustment bolt 56 are rigidly secured together while the belt is rotated but can be moved longitudinally in the elongated opening or slot 53 to adjust the tension on belt 46 about rollers 47, 48 and 49 by turning threaded adjustment bolt 56 in the threaded opening of end member 71 of bracket 52.

Figure 4:
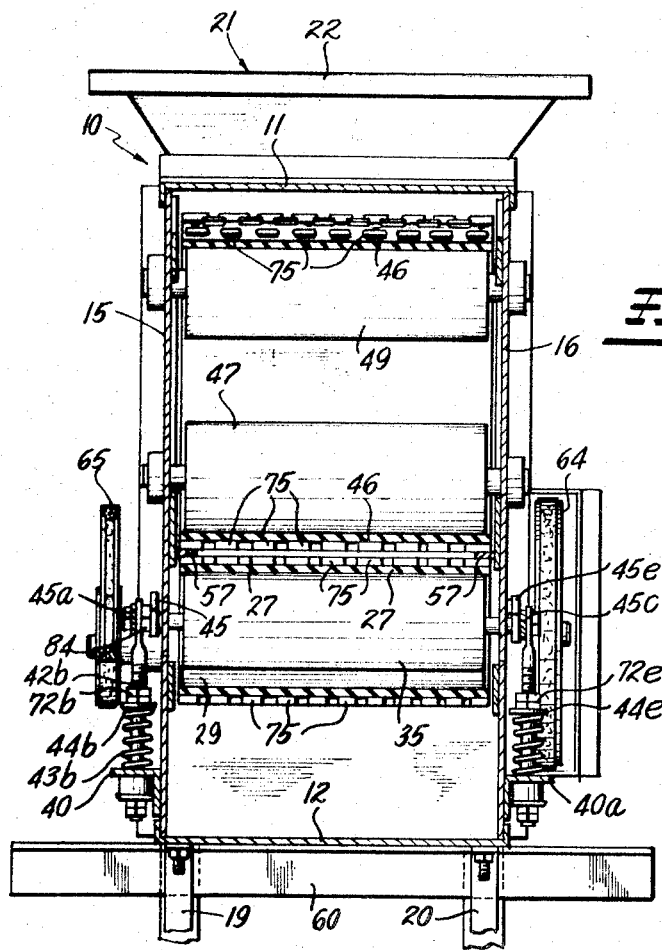
FIG. 4 is a transverse section along the line 4-4 of FIG. 3.

As indicated in FIG. 3, roller 29 lies under sloping bottom 23 of hopper 21 and the upper portion of the loop of belt 27 extends back of the point where pecans or other nuts strike it as they fall from hopper 21. As is apparent from FIG. 4, the width of belts 27 and 46 is approximately equal to the width of chamber 28. Likewise, the length of rollers 29, 30, 35, 36, 37, 47, 48, 49, 50 and 51 is such that the rollers extend across the chamber 28 with their ends adjacent sidewalls 15 and 16. A narrow metal strip 57 overlies each edge of belt 27 as shown in FIGS. 3 and 4 and has one edge lying against the adjacent sidewall of housing 10 to seal the space between the edge of the belt and the sidewall. The strip 57 extends substantially between the discharge end of belt 27 and to a point beyond the opposite end of the belt 27 where it is rigidly secured to a bracket 58 mounted on the inner wall of each sidewall 15 and 16. A discharge chute 59 extends through the bottom 12 of housing 10 from adjacent that end of belt 27 trained about roller 30. Rotary motion is transmitted from electric motor 62 to sheave 63 fixedly secured to the shaft of roller 29. Sheave 64 is fixedly secured to the other end of the shaft of roller 29. V-belt 65 is trained about sheave 64, below idler 66 and about sheave 67 which is fixedly secured to the shaft of roller 48. When the motor is running, rollers 29 and 48 are rotated in the directions indicated by the arrows in the drawing, and belts 27 and 46 are rotated in directions opposite to each other. Belts 27 and 46 are rubber belts having a plurality of spaced protuberances 75 thereon.

The distance between rollers 35 and 47 may be adjusted by loosening nuts 73 and 73c, turning bolts 42 and 42c to raise or lower roller 35 and then again tightening bolts 73 and 73c. Rollers 36 and 37 may be similarly adjusted. Compression springs 43 and 43c are preferably softer or more easily compressed than the other compression springs. It is advantageous for roller 35 to be as resilient as possible so it will permit nuts of various sizes to enter the space between the belts. Then greater pressure can be applied between the subsequent pairs of rollers.

When the device is operating, belt 27 is usually traveling at a speed of about 700 feet per minute and belt 46 is traveling at from about 300 to 400 feet per minute in the opposite direction. Pecan bollies or other nuts having shucks thereon are poured into hopper 21. They flow by gravity to the portion of the upper surface of belt 27 which extends under hopper 21. Belt 27 carries the nuts towards the nip between belts 27 and 46 adjacent rollers 35 and 47. The direction of travel of belt 46 tends to repel the nuts and retard their flow into the nip between rollers 35 and 47. However, the direction of travel of belt 27 tends to urge the nuts between the rollers 35 and 47. Since belt 27 rotates faster than belt 46, the nuts are forced between the belts 27 and 46 and rollers 35 and 47. The nuts are spinning about an axis which extends transversely across the belt. As the nuts are carried forward by belt 27 the shucks are crushed between the pairs of opposite idler rollers which resist the flow of the nuts. The lower idler wheels 35, 36 and 37 are adjusted as described above to compress the nuts between the belts and the opposing rigidly secured rollers but since they are resiliently supported they will respond to the pressure as the nuts pass between the rollers before the nut shells are cracked or broken. The combined compression between rollers and abrasion action of the oppositely traveling belts breaks and removes the shucks from the nuts. A belt having an elastomeric surface with spaced protuberances similar to those illustrated as 75 is particularly advantageous because the protuberances catch on broken edges of fragments of shucks still on a nut and pull the fragments away from the nut shell. The nuts and broken shucks are collected through the discharge chute and may be separated from each other by screening or other separating process.

The length of shaft of bolts 42 and of 42a through 42e above the adjustment bars 40 and 40a is varied with the size of the nuts to be shucked, the variety of the nuts and the tenacity with which the shucks adhere to the nut shell. It is important that the spacing between the opposing idler rollers and belts 27 and 46 be such that the shucks are removed but the nut shells are not cracked. Likewise, the speeds of the two belts and the differential therebetween is selected to insure that the shucks are removed before the nuts are discharged but at the same time to produce an optimum quantity of product. The general rule is the larger the nuts the greater the space between rollers and the greater the difference between the speeds of the two belts.

The configuration of the loop of belt 46 shown in the drawing is especially advantageous because the vertical surface facing hopper 21 prevents nuts and shucks from being carried above belt 46 so such a confuiguration is preferred. However, roller 49 may be deleted and belt 46 may be looped about rollers 47 and 48 in a substantially elliptical configuration. It is advantageous, however, to suspend a panel 61 vertically from top 11 to a point adjacent the traverse of belt 46 about roller 48 to act as a baffle and prevent nuts from passing above belt 46.

Although belts having protuberances on their surfaces are preferred because the protuberances assist in removing shucks from the nuts, belts having roughened or smooth surfaces may be used. The protuberances may have any shape such as frustopyramidal, knob-like or the like.

Although the invention has been described in detail for the purpose of illustration, it is to be understood that such detail is solely for that purpose and that variations can be made by those skilled in the art without departing from the spirit and scope of the invention except as it may be limited by the claims.

What is claimed is:

1. An apparatus for shucking nuts comprising a housing which encloses a shucking chamber, a first continuous belt extending transversely across the chamber and looped about a first pair of longitudinally spaced transverse rollers, one of the pair of rollers being a drive roller and the other one being an idler roller, at least one intermediate transverse idler roller disposed between the said pair of rollers supporting the upper portion of the belt loop and resiliently mounted to move vertically in response to variation in load applied to the upper portion of the belt loop, a second continuous belt extending transversely across the chamber and looped about a second pair of longitudinally spaced transverse rollers, the lower portion of the loop of the second belt lying above and in face to face relationship with the upper portion of the loop of the first belt, one of said second pair of rollers being a drive roller and the other being an idler roller fixed against vertical movement and disposed opposite the said intermediate roller which supports the first belt, means for introducing nuts to be shucked into the nip between the belts adjacent the said intermediate roller, means for rotating the two drive wheels and moving the belts in opposite directions and at different speeds, and means for discharging shucked nuts from the shucking chamber.

2. The apparatus of claim 1 wherein three intermediate transverse idler rollers are longitudinally spaced between the said first pair of rollers and support the upper portion of the loop of the first belt, each of the intermediate rollers being resiliently mounted to permit vertical movement of the rollers in response to a load on the first belt, and two intermediate transverse idler rollers are spaced longitudinally between the said second pair of rollers and lie against the lower portion of the second belt in positions opposite intermediate idler rollers supporting the first belt, the shafts of each of the two intermediate idler rollers of the second belt being rigidly secured against vertical movement.

3. The apparatus of claim 2 wherein the belts have elastomeric work surfaces with spaced protuberances.

4. The apparatus of claim 2 wherein the second belt is trained about an idler roller having its shaft journaled in bearings fixedly secured on the housing and disposed above the roller of said second pair which is nearest the hopper.

5. The apparatus of claim 4 having a strip disposed over the juncture of each side of the first belt with the housing, said strip being fixedly secured only at one end thereof so it can move vertically with the belt as it responds to vertical movement of a resiliently mounted idler wheel.

6. The apparatus of claim 2 wherein one end of the shaft of each idler roller intermediate the said first pair of rollers is rigidly secured against rotation, both ends of each shaft is resiliently mounted on a means for adjusting the vertical position of the roller with respect to the housing and each roller is journaled in bearings for rotation thereof relative to the shaft.

7. An apparatus for shucking nuts comprising a housing enclosing a shucking chamber, a first continuous belt looped about a first pair of spaced rollers, a second continuous belt looped about a second pair of rollers and disposed immediately above the first belt in face to face relationship, means to rotate the first belt in one direction and means to rotate the second belt in the opposite direction, an intermediate idler roller disposed between the said first pair of rollers and immediately below a roller fixed against vertical movement and within the loop of the second belt, said intermediate idler roller being resiliently mounted and adapted to move vertically relative to the said fixed roller and thereby vary the spacing therebetween in response to pressure exerted by nuts passing therebetween, means for introducing nuts to be shucked between the belts, and means for discharging shucked nuts from the chamber.

8. The apparatus of claim 6 wherein the shafts of the three spaced intermediate rollers which support the first belt extend through openings in opposite walls of the housing, a substantially horizontal adjustment bar is rigidly secured on each of the walls below the openings, an adjustment bolt having a head and a threaded shaft extends downwardly from each end of each intermediate roller shaft through an opening in the adjustment bar, a compression spring surrounds the bolt shaft above the adjustment bar adjacent one side of the housing, a linkage arm is rigidly secured at one end to the shaft of the middle of the three rollers and at the other end is rigidly secured to the shaft of an adjacent intermediate roller, another linkage arm is loosely secured at one end to the shaft of the said adjacent roller and at the opposite end is loosely secured to the housing, a second linkage arm is loosely secured to the shaft of the said middle roller and loosely secured at its opposite end to the shaft of the second roller adjacent the middle roller, a third linkage arm is rigidly secured at one end to the shaft of the said second adjacent roller and at its opposite end loosely secured to the housing, the shafts of the rollers are loosely connected by linkage arms adjacent the other side of the housing, and an adjustment nut on each bolt shaft below the adjustment bar whereby each end of each intermediate roller can be moved vertically independently of the others.

* * * * *